United States Patent
Thomas

(10) Patent No.: US 8,924,086 B2
(45) Date of Patent: Dec. 30, 2014

(54) METHOD FOR CONTROL OF SEAT MOUNTED AIRBAG IN A SEAT WITH ARMREST

(75) Inventor: Scott D. Thomas, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 192 days.

(21) Appl. No.: 13/363,404

(22) Filed: Feb. 1, 2012

(65) Prior Publication Data

US 2013/0197764 A1 Aug. 1, 2013

(51) Int. Cl.
*B60R 21/16* (2006.01)

(52) U.S. Cl.
USPC .......................................................... 701/45

(58) Field of Classification Search
None
See application file for complete search history.

(56) References Cited

U.S. PATENT DOCUMENTS

| 5,628,543 A * | 5/1997 | Filipovich et al. ............. 297/113 |
| 6,217,112 B1 * | 4/2001 | Linsenmeier et al. ........ 297/113 |
| 2007/0193811 A1 * | 8/2007 | Breed et al. .................... 180/271 |
| 2009/0079248 A1 * | 3/2009 | Keyser et al. ............. 297/362.11 |
| 2011/0278826 A1 * | 11/2011 | Fukawatase et al. ...... 280/730.2 |

* cited by examiner

*Primary Examiner* — Thomas Tarcza
*Assistant Examiner* — Garrett Evans

(57) ABSTRACT

An airbag is mounted in a vehicle seating system having both the airbag and a pivoting armrest on the same side of the occupant seating position. The armrest pivots between a vertical stored position and a horizontal armrest position. The deployment of the airbag is controlled by deployment logic including: sensing the position of the pivoting armrest to determine the vertical position or the horizontal position; sensing vehicle conditions indicative of a need to deploy the airbag mounted on the seat back; and not deploying the airbag mounted on the seat back if the armrest is in the vertical stored position.

19 Claims, 4 Drawing Sheets

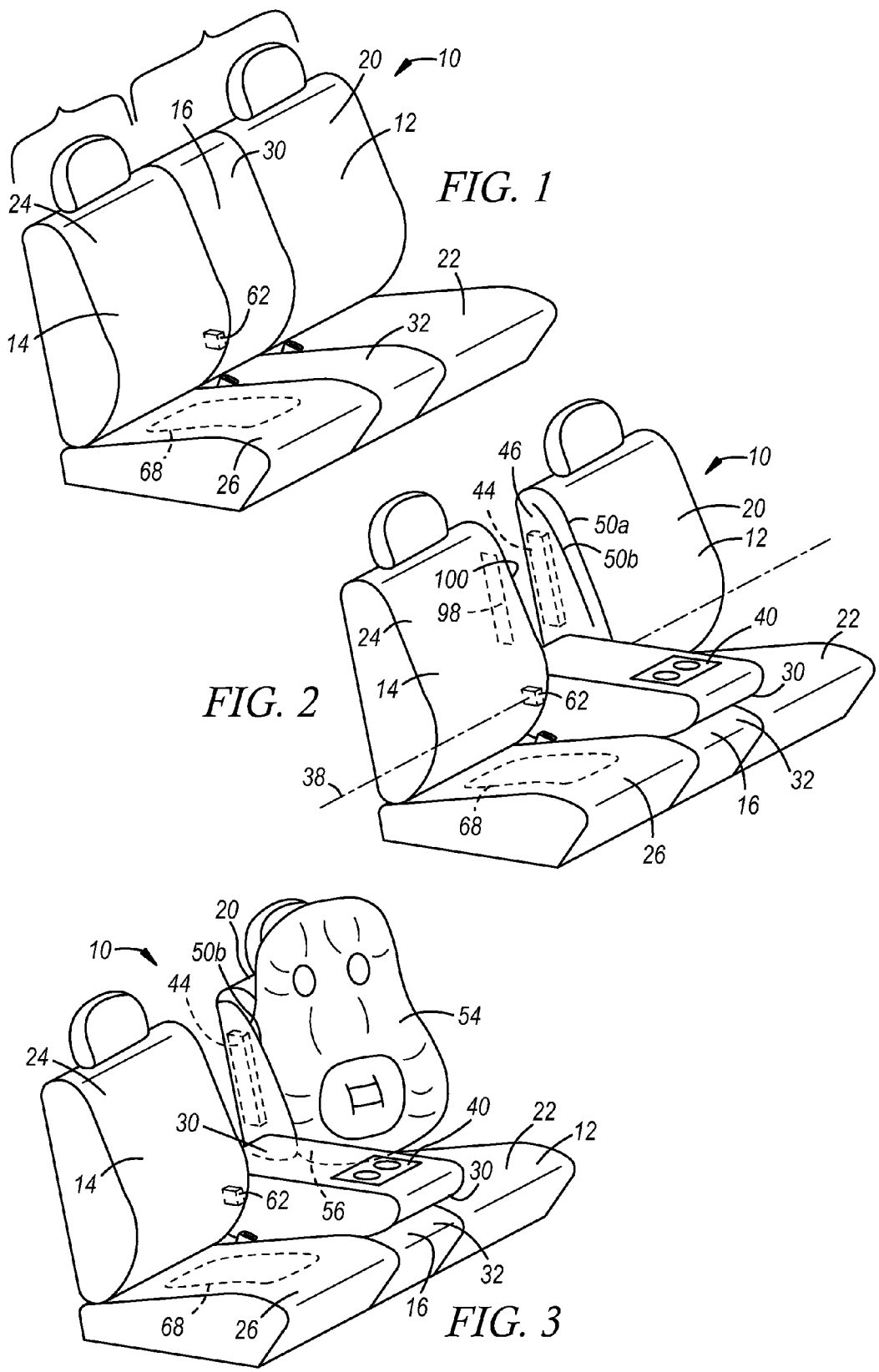

METHOD FOR CONTROL OF SEAT MOUNTED AIRBAG IN A SEAT WITH ARMREST

FIELD OF THE INVENTION

The present invention relates to controlling an airbag mounted on a vehicle seat that has a pivoting armrest.

BACKGROUND OF THE INVENTION

Motor vehicles are conventionally equipped with seating systems for seating a driver and one or more passengers. The seating systems are designed to provide optimal comfort and convenience for the seated passengers. For example, seating systems are known to include various combinations of bench seats for seating two or more occupants, and captain chairs for seating individual occupants. In the front of the vehicle, the seats are traditionally mounted on one or more seat adjusters. In the rear of the vehicle, the seats are traditionally fixed in place without seat adjusters.

Pivoting armrests are often mounted on the seats to enhance occupant comfort. In some cases, the pivoting armrest can provide all or part of the seat back for the center seat occupant.

Motor vehicles are also equipped with occupant restraint systems including seatbelts and airbags. In some cases, an occupant restraint system includes an airbag mounted on the inboard side of a seat, such as the driver-side seat, and will deploy to restrain the occupant.

It would be desirable to provide a method for improving the deployment of the seat mounted airbag in those situations where the vehicle seating system includes both a pivoting armrest and an adjacent airbag mounted on the same side of the occupant seating position, such that the position of the armrest affects the deployment of the airbag.

SUMMARY OF THE INVENTION

An airbag is mounted in a vehicle seating system having both the airbag and a pivoting armrest on the same side of the occupant seating position. The armrest pivots between a vertical stored position and a horizontal armrest position. The deployment of the airbag is controlled by deployment logic including: sensing the position of the pivoting armrest to determine the vertical position or the horizontal position; sensing vehicle conditions indicative of a need to deploy the airbag mounted on the seat back; and not deploying the airbag mounted on the seat back if the armrest is in the vertical stored position.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

DESCRIPTION OF THE DRAWINGS

The present invention will become more fully understood from the detailed description and the accompanying drawings.

FIG. 1 is a perspective view of a vehicle seat for seating a driver-side occupant, a passenger-side occupant, and a center occupant.

FIG. 2 is a view similar to FIG. 1 but showing the center occupant seat back folded down to a horizontal armrest position.

FIG. 3 is a view similar to FIG. 2 but showing the deployment of an airbag mounted on the inboard side edge face of the driver-side seat back.

DETAILED DESCRIPTION OF THE EXEMPLARY EMBODIMENTS

Figure 4:
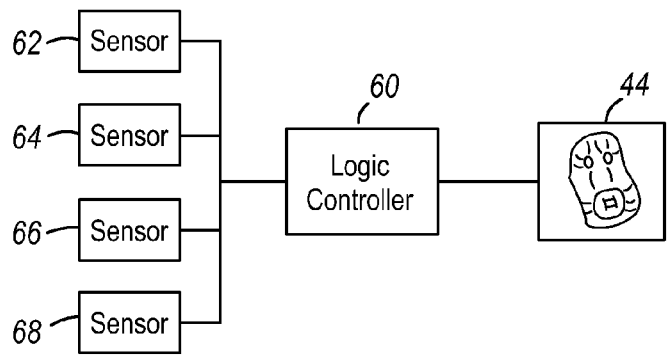
FIG. 4 is a schematic of a control system for controlling deployment of the airbag.

The following description of certain exemplary embodiments is merely exemplary in nature and not intended to limit the invention, its application, or uses.

Referring to FIG. 1, a vehicle seat is shown for seating three occupants side-by-side in a motor vehicle. The seat 10 provides a driver-side seat 12, a passenger-side seat 14, and also a center occupant seat 16 that is intermediate the driver-side seat 12 and the passenger-side seat 14. The driver-side seat 12 includes a driver-side seat back 20 and a driver-side seat bottom 22. The passenger-side seat 14 includes a passenger-side seat back 24 and a passenger-side seat bottom 26. The center occupant seat 16 includes a center seat back 30 and a center seat bottom 32. A seatbelt system (not shown) would also be provided for each of the occupant seating positions.

The seat 10 can be mounted in the rear of the vehicle or in the front of the vehicle. If mounted in the front of the vehicle, the seat 10 is mounted on a seat adjuster mechanism. The front seat can be a bench seat in which case the entire seat 10, including the driver-side seat bottom 22, passenger-side seat bottom 26, and center seat bottom 32, will be mounted on the same seat adjuster mechanism for fore and aft adjusting movement as a single unit. Alternatively, the front seat can be a 60/40 seat, in which case the driver-side seat 12 and the center occupant seat 16 are mounted together on a first seat adjuster mechanism and the passenger-side seat 14 is mounted on a second seat adjuster mechanism. In addition, in some vehicles, the center seating position can be stationary or move independently from the outboard seats. Accordingly, the driver's seat can be adjusted for fore and aft movement independently of the passenger-side seat 14 and in some cases, independently from the center occupant seat 16.

As best seen in FIG. 2, the center seat back 30 is mounted for pivoting movement about a pivot axis 38 by which the center seat back 30 can rotate between a vertical seat back forming position of FIG. 1, and a folded down horizontal armrest or console position, shown in FIG. 2. The backside of the center seat back 30 can be provided with cupholders 40 or other storage features for convenient use by either a driver-side occupant or passenger-side occupant. Also, when the seat is mounted in the rear of the vehicle, folding the center seat back 30 down to the horizontal position can provide access to a cargo pass through door opening into the cargo area behind the seat 10, as will be discussed hereinafter in reference to FIGS. 9-11.

When the center seat back 30 is folded down to the armrest or console position of FIG. 2, it is seen that the vehicle seat 10 can accommodate only two passengers, that is, the driver-side occupant and the passenger-side occupant. However, when the center seat back 30 is at its vertical position of FIG. 1, the seat 10 can accommodate three passengers, including, a driver-side occupant, passenger-side occupant, and a center occupant.

Referring to FIG. 2, it is seen that a side restraint airbag assembly 44 is mounted within the inboard side face 46 of the driver-side seat back 20. A tear seam 50 is provided in the inboard side edge of the driver-side seat back 20. The tear seam can be a tear seam 50a located relatively forward at the corner of the inboard side face 46 or a tear seam 50b located further back along the inboard side face 46.

FIG. 3 shows a deployment of an airbag 54 through the tear seam 50b. In FIG. 3, the center seat back 30 is folded down to its forward horizontal armrest or console position such that the tear seam 50 is unobstructed and therefore the airbag 54 has been deployed without being blocked by the center seat back 30. In FIG. 3, the bottom portion 56 of the airbag 54 optionally extends downwardly to overlap with the horizontal console position of the center seat back 30 so that the center seat back 30 will be engaged by the bottom portion 56 and the seat back 30 will function to aid in supporting the deployed position of the airbag 54. Reference may be had to U.S. patent application Ser. No. 13/244,354, filed Sep. 24, 2011, and entitled SIDE IMPACT AIRBAG CUSHION, for an example of an airbag cushion that is suitable for use in FIG. 3.

Referring again to FIG. 1, it is seen that with the center seat back 30 located at its vertical seat back position, the center seat back 30 would interfere with a deployment of the airbag 54 from the airbag assembly 44 mounted on the inboard side face 46 of the driver-side seat back 20.

FIG. 4 is a schematic of the elements of a control system for controlling the deployment of the airbag 54 in the vehicle seat 10 shown in FIGS. 1 to 3. A logic controller 60 receives inputs from sensors 62, 64, 66, and 68. The logic controller 60 processes the input from sensors 62, 64, 66, and 68, as well as other inputs, such as the vehicle ignition, etc., and provides a deployment signal to the inflator of the airbag assembly 44 mounted in the driver-side seat back 20. A seat back position sensor 62, shown in FIGS. 1, 2, and 3, senses the position of the center seat back 30, including whether the center seat back 30 is at its vertical seat back position of FIG. 1 or its folded down horizontal armrest and console position of FIGS. 2 and 3. A side impact sensor 64, which is likely a sensor array, senses a side impact of a predetermined severity and senses whether the side impact occurs on the driver-side of the vehicle or the passenger side of the vehicle. A rollover sensor 66 senses a vehicle rollover condition. Sensor 68 is a passenger-side occupant sensor that senses the presence of an occupant in the passenger-side seat 14. FIGS. 1, 2, and 3 show the sensor 68 as a pressure pad mounted in the passenger-side seat bottom 26. Alternatively, however, the occupant sensor can be any known occupant sensor, such as an optical sensor, radar sensor, electric field sensor, or the like.

Figure 5:
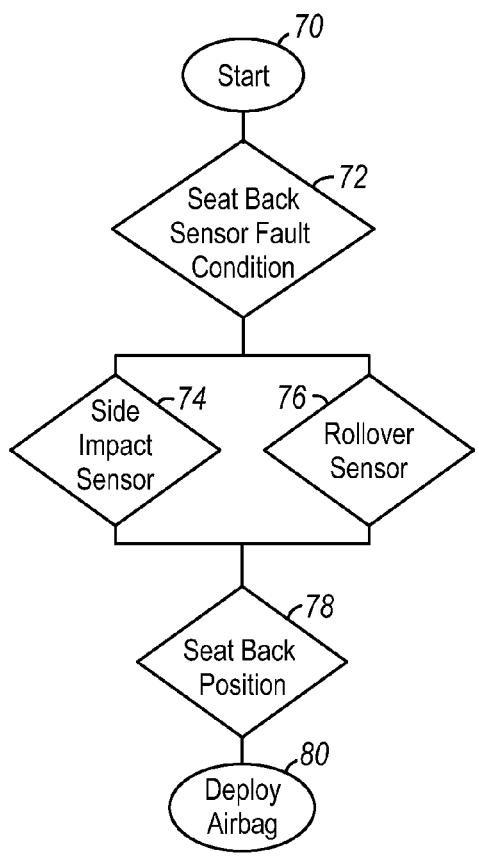
FIG. 5 is a flowchart showing the deployment logic that is performed by the controller of FIG. 4.

FIG. 5 is a flowchart showing the deployment logic that is performed by the controller 60 of FIG. 4. The deployment logic begins at step 70. At step 72 the controller 60 examines whether there is a fault condition in the seat back position sensor 62. If there is not a fault in the seat back position sensor 62, the controller 60 goes to steps 74 and 76 and examines the side impact sensor 64 and the rollover sensor 66. If either the side impact sensor 64 is sensing a side impact of a certain threshold, or the rollover sensor 66 is sensing a rollover condition of a pre-determined severity, the controller 60, then goes to step 78 and examines the seat back position sensor 62. If the seat back position sensor 62 is sensing that the center seat back 30 is at its folded down horizontal armrest console position, then the airbag 54 will be deployed at step 80. Thus, it is seen that the controller 60 performs a deployment logic that results in a deployment of the airbag 54 only if: (a) the seat back position sensor 62 is free of faults, (b) either a side impact or rollover condition is encountered, and (c) the center seat back 16 is in the horizontal console position of FIG. 3 where the center seat back 30 will not obstruct a deployment of the airbag 54. It will be understood that the steps 72, 74, 76, and 78 need not be performed in the exact order shown in FIG. 5. Indeed, the controller 60 will be constantly monitoring conditions at each of the sensors and processing those inputs simultaneously to arrive at the decision to deploy the airbag 54.

Figure 6:
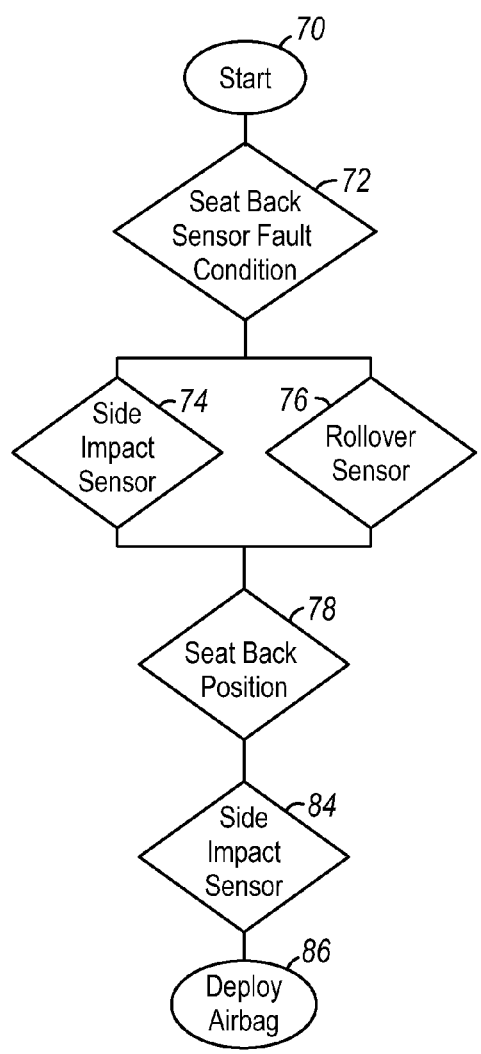
FIG. 6 is a flowchart showing an alternative deployment logic performed by the controller of FIG. 4.

FIG. 6 is a flowchart showing an alternative deployment logic that can be performed by the controller 60 of FIG. 4. In FIG. 6, steps 70, 72, 74, 76, and 78 are the same as in FIG. 5. In step 84, the controller 60 examines the input from the side impact sensor 64 and determines whether the side impact has occurred on the driver-side of the vehicle or the passenger side of the vehicle. If the impact has occurred on the driver-side of the vehicle, the controller 60 decides whether to deploy the airbag at step 86 depending on the particular sensed conditions and the severity of such conditions, as well as the performance of other occupant restraint systems, such as belt tensioners and frontal airbags. For example, the deployment logic may decide to not deploy the airbag 54 because the deployment of the airbag 54 which is mounted on the inboard side of the driver seat will not provide much benefit to the occupant seated in the driver-side seat 12. Or, the deployment logic may deploy at step 86 with a deployment delay since providing a deployment with a delay may best phase this restraint with other restraints in the vehicle for the driver occupant and may provide some benefit to the driver occupant. The decision to deploy or not deploy is made depending on the particular sensed conditions and the severity of such conditions, as well as the performance of other occupant restraint systems, such as belt tensioners and frontal airbags.

On the other hand, at step 84, if the impact has occurred on the passenger side of the vehicle, the controller 60 will proceed to deploy the airbag 54 at step 86 for the benefit of the occupant seated in the driver-side seat 12.

Figure 7:
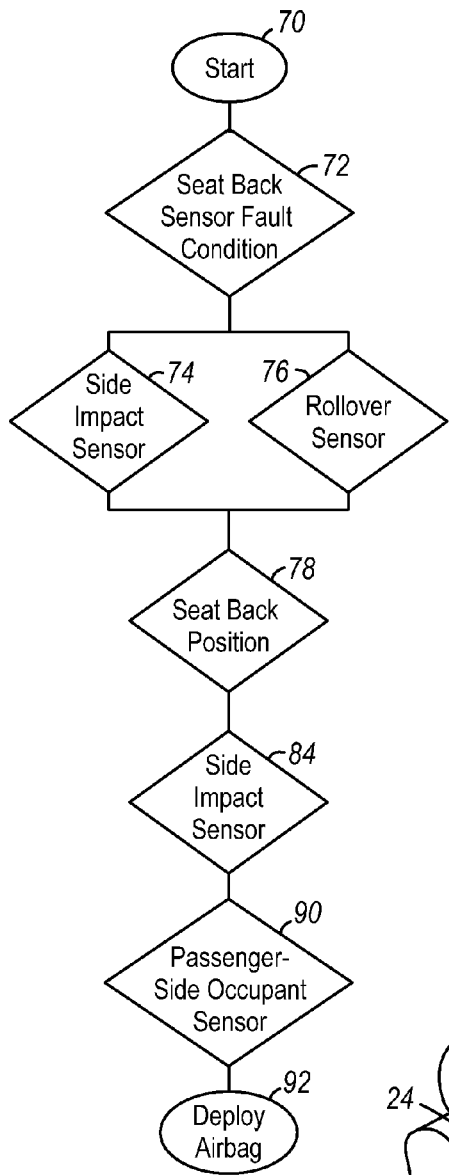
FIG. 7 is a flowchart showing yet another alternative deployment logic for the controller of FIG. 4.

FIG. 7 is another flowchart showing another alternative deployment logic that can be performed by the controller 60 of FIG. 4. In FIG. 6, steps 70, 72, 74, 76, 78, and 84 are the same as in FIG. 5. At step 90, after determining at step 84 that the impact has occurred on the driver-side of the vehicle, the controller 60 examines the passenger-side occupant sensor 68 to determine whether a passenger is seated in the passenger-side seat 14. If there is no occupant seated in the passenger-side seat 14, the controller 60 will not deploy the airbag. On the other hand, if there is a passenger seated in the passenger-side seat 14, the controller will deploy the airbag 54 at step 92 because it is useful to deploy the airbag into the space between the occupant seated in the passenger-side seat 14 and the occupant seated in the driver-side seat 12. The deployment of the airbag 54 can be performed in unison with deployment of other airbags in the vehicle, or, deployment of the airbag 54 can be performed with a deployment delay that may best phase this restraint with other restraints. The foregoing description of the flowcharts is intended to explain the general logic performed in deployment of the airbag system of FIGS. 1, 2, and 3. It will be understood that additional logic will be employed according to the prior art for calibrating the actual deployment times and delays as appropriate to coordinate the deployment with the various sensed conditions of impact or rollover as well as coordinate the airbag deployment with other systems, such as built pre-tensioners, other side airbags, and front airbags.

Referring again to FIG. 2, the passenger-side seat back 24 can be equipped with an airbag assembly 98 that is mounted on the inboard side face of the passenger seat back 24 for deployment through a tear seam 100. The deployment logic described herein can control the deployment of both the airbag assemblies 44 and 98. In particular, as described in FIG. 5, the airbag assembly 98 will not be deployed when the center seat back 30 is in its folded up vertical position of FIG. 1. In addition, the passenger-side occupant sensor 68 can be employed to allow activation of the airbag assembly 98 only if an occupant is present in the passenger seat 14. Alternatively, it will be understood that the airbag assembly 44 can be omitted and the airbag assembly 98 can be employed to provide restraint for the driver-side occupant even if the passenger-side seat 14 is not occupied.

Figure 8:
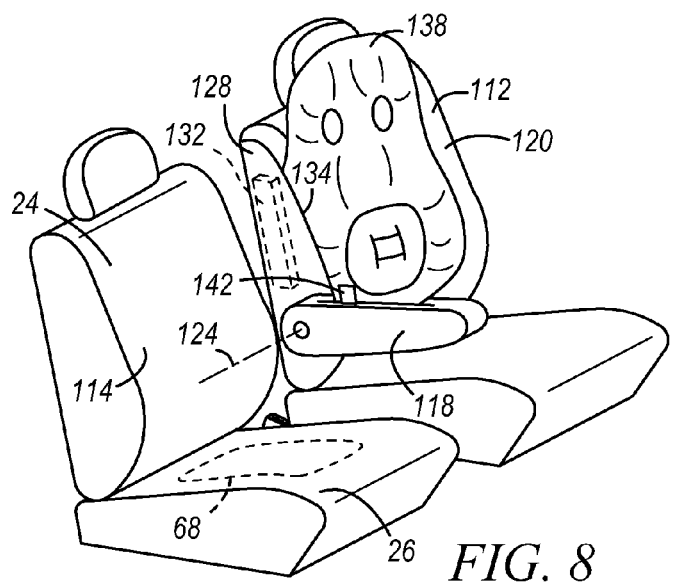
FIG. 8 is a perspective view of a vehicle seating system that includes a driver-side seat and a passenger-side seat, with an armrest on the driver-side seat back.

The vehicle seats can be individual seats, such as bucket seats or captains chairs, shown in FIG. 8. In FIG. 8, the driver-side seat 112 is situated alongside passenger-side seat 114, and each seat is mounted on its own seat adjuster mechanism. If desired, a storage console, not shown, can be mounted on the vehicle floor between the driver-side seat 112 and passenger-side seat 114. As shown in FIG. 8, the driver seat 112 has an armrest 118 that is mounted on a driver-side seat back 120 for pivoting movement about a pivot axis 124 between the horizontal armrest forming position of FIG. 8 and a vertical stored position in which the armrest 118 lies alongside an inboard edge face 128 of the passenger-side seat back 120. An airbag assembly 132 is mounted inside the driver-side seat back 120 for deployment through an airbag seam 134 provided on the inboard edge face 128 of the driver-side seat back 120.

In FIG. 8, it is seen that the armrest 118 would interfere with deployment of an airbag 138 if the armrest 118 is in its vertical stored position. Accordingly, an armrest position sensor 142 is associated with the armrest 118 to sense the position of the armrest 118. The armrest position sensor 142 will take the place of the center seat back position sensor 62 in the schematic of FIG. 4 so that the deployment of the airbag 138 of FIG. 8 is controlled in part by the position of the armrest 118. The airbag 138 will not deploy when the armrest 118 is at its vertical stored position, and will otherwise be deployed or not deployed according to the various logic steps described in FIGS. 5, 6, and 7. In FIG. 8, both the armrest 118 and the airbag assembly 132 are mounted on the inboard side of the driver seat 112. However, both the armrest and the airbag assembly can be mounted on the outboard side of the driver seat 112, and the deployment logic of FIG. 5 can be employed to control the deployment of the airbag 138.

Figure 9:
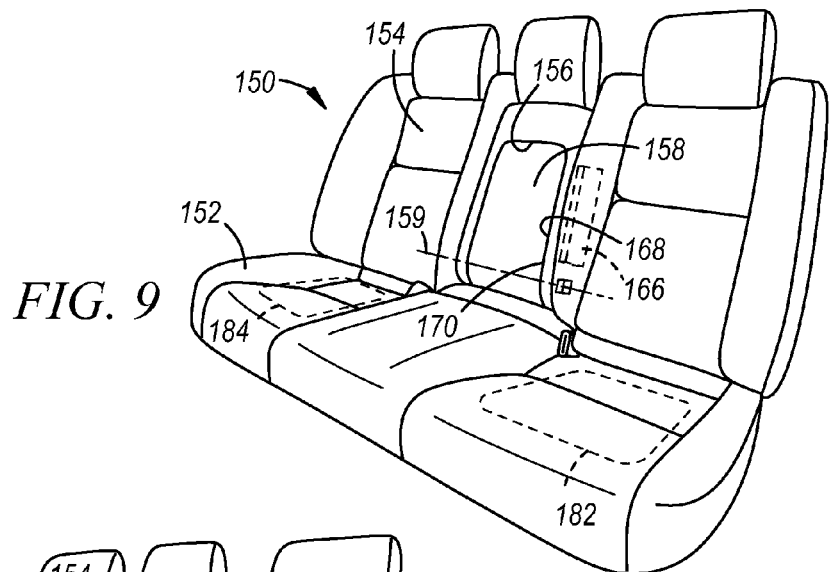
FIG. 9 shows a vehicle rear seat for seating a driver-side occupant, a passenger-side occupant, and a center occupant, and having an armrest providing a portion of the seat back for the center occupant.
Figure 10:
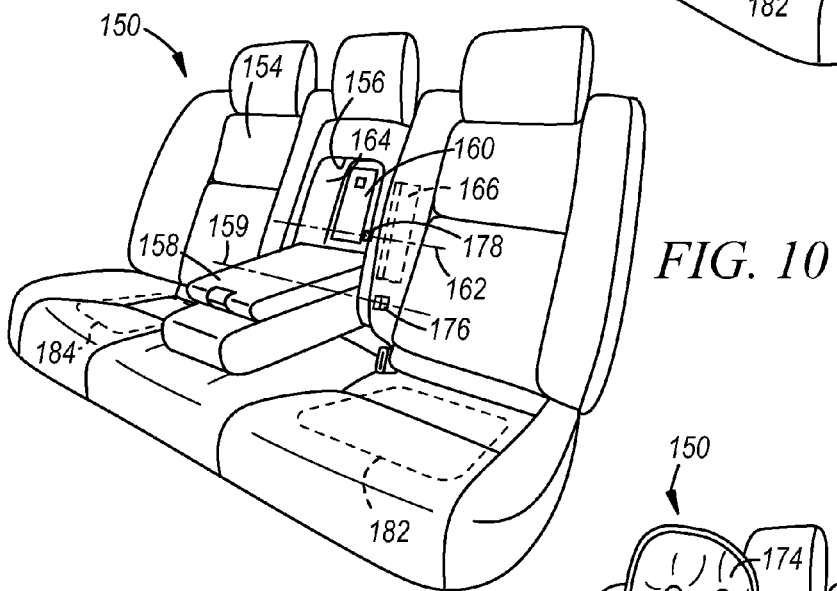
FIG. 10 is a view similar to FIG. 9 but showing the armrest folded down and an access door communicating with the cargo compartment.
Figure 11:
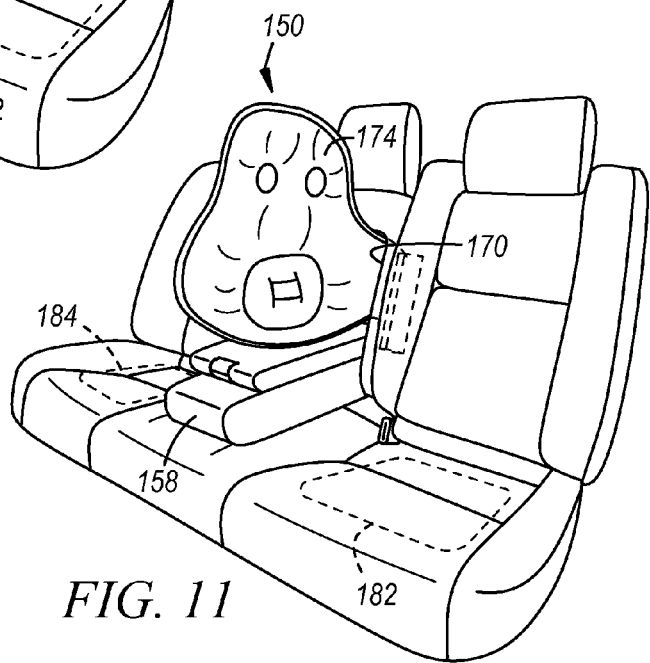
FIG. 11 is a view similar to FIG. 10 but showing deployment of an airbag mounted on the inboard side edge face of the driver-side seat back.

FIGS. 9, 10, and 11, show the invention as applied to the rear bench seat 150 in a motor vehicle. In FIG. 9, it is seen that the rear bench seat 150 has a continuous seat bottom 152 and continuous seat back 154 that seat a driver-side occupant, a center occupant, and a passenger-side occupant. The seat back 154 has a center opening 156 that stores an armrest 158.

The armrest 158 pivots about an axis 159 between a folded up horizontal back rest position of FIG. 9, and a folded down horizontal armrest forming position of FIG. 10. In addition, as seen in FIG. 10, an access door 160 is provided in bulkhead wall 164 just behind the seat back 154. The access door 160 is pivotally mounted for movement about axis 162 between the vertical closed position shown in FIG. 10 and a horizontal open position, not shown. When the access door 160 is in its horizontal open position, not shown, skis, lumber, or other cargo can be stored partly in the luggage compartment but also extend forwardly into the occupant compartment.

Referring again to FIG. 9, an airbag assembly 166 is mounted within the seat back 154 on a side edge face 168 of the center opening 156. A tear seam 170 is provided on the side edge face 168 so that the airbag can be deployed as shown in FIG. 11. Alternatively, the airbag assembly 166 could be located at the top of the center opening 156, on the seat back above the center opening 156, on the bulkhead wall 164, on the access door 160, or any combination of these.

As best seen in FIG. 10, a position sensor 176 is associated with the armrest 158 for sensing whether the armrest 158 is at its vertical seat back forming position of FIG. 9 or at its folded down horizontal armrest forming position of FIG. 10. In addition, a position sensor 178 is associated with the access door 160 for sensing whether the access door 160 is in the closed position of FIG. 10 or an open position, not shown in the drawings.

It will be understood that the activation of the airbag assembly 166 would not be desirable if the armrest 158 is in the vertical seat back forming position of FIG. 9 because the presence of the folded up armrest 158 would be obstructing the deployment of airbag 174 in FIG. 11. Accordingly, the deployment logic of FIGS. 5, 6, and 7 can be utilized to either deploy or not deploy the airbag 174. In addition, when the armrest 158 is folded down to its position of FIG. 10, the position sensor 178 associated with the access door 160 can sense whether the access door 160 is open, thus indicating the presence of the cargo extending into the passenger compartment. Accordingly, the position sensor 178 for the access door 160 can be added to the schematic of FIG. 4 and another step added to the deployment logic to block the deployment of the airbag if the folded down position of the access door 160 is indicating the presence of cargo. In addition, an occupant sensor 182 is provided to sense the presence of a driver-side occupant and an occupant sensor 184 is provided to sense the presence of a passenger-side occupant. Accordingly, the deployment logic can consider whether or not these occupants are present, and control the deployment of airbag 174 accordingly.

Although FIGS. 9, 10, and 11 show just one airbag assembly mounted near the center opening 156, it may be desirable to also provide a second airbag assembly mounted near the center opening 156 such as on the side of the center opening 156 opposite from the airbag assembly 166. This additional airbag can also be deployed or not deployed consistent with the deployment logic flowcharts discussed herein.

The terms "armrest" and "console" describe the use of the pivoting member, as variously shown at 30, 118, or 158, are used interchangeably herein to describe the use of the pivoting member as either an armrest or console, either of which can be convenient for the vehicle user.

What is claimed is:

1. A method for controlling an airbag mounted in a seat back of a vehicle seating system having both the airbag and a pivoting armrest mounted on the seat back on a same side of an occupant seating position defined by the seat back, and the pivoting armrest pivots relative the seat back and the airbag between a vertical position of the armrest interfering with a deployment of the airbag mounted on the seat back and a horizontal position of the armrest permitting unobstructed deployment of the airbag, comprising:

sensing a position of the pivoting armrest mounted on the seat back to determine the vertical position or the horizontal position;

sensing vehicle conditions indicative of a need to deploy the airbag;

and not deploying the airbag if the pivoting armrest mounted on the seat back is in the vertical position interfering with the deployment of the airbag mounted on the seat back.

2. The method of claim 1 further comprising the vehicle seating system including a driver-side seat and a passenger-side seat and the pivoting armrest being mounted on the inboard side of a driver-side seat back.

3. The method of claim 1 further comprising the vehicle seating system including a driver-side seat, a passenger-side seat, and a center occupant seat, and the pivoting armrest providing a backrest for the center occupant seat when pivoted to the vertical position.

4. The method of claim 1 further comprising the vehicle seating system including a driver-side seat, a passenger-side seat, and a center occupant seat, the center occupant seat having a back rest with a center opening therein in which the pivoting armrest is stored to form a part of the back rest for the center occupant seat when pivoted to the vertical position.

5. The method of claim 1 further comprising the armrest being inboard the driver-side seat and the sensing of the vehicle conditions including sensing the presence of an impact on the driver-side and not deploying the airbag if the impact is on the driver side.

6. The method of claim 1 further comprising the pivoting armrest being inboard the driver-side seat and the sensing of the vehicle conditions including sensing the presence of an impact on the driver side and deploying the airbag with a delay if the impact is on the driver side.

7. The method of claim 1 further comprising the pivoting armrest being inboard the driver-side seat and the sensing of the vehicle conditions including sensing the presence of an impact on the driver side of the vehicle, sensing the presence of an occupant seated on a passenger-side seat, and deploying the airbag if the impact is on the driver side and an occupant is seated in the passenger-side seat so the airbag is deployed between a driver-side occupant and a passenger-side occupant.

8. The method of claim 7 further comprising the pivoting armrest being inboard the driver-side seat and the sensing of the vehicle conditions including sensing the presence of an impact on the driver side and deploying the airbag with a delay if the impact is on the driver side.

9. The method of claim 4 further comprising the vehicle seating system mounted in an occupant compartment of a vehicle having a luggage compartment rearwardly of the center occupant seat and defined by a bulkhead separating the occupant compartment and the luggage compartment, an access door pivotally mounted on the bulkhead for movement between a vertical closed position separating the occupant compartment and the cargo compartment and an open horizontal position when the pivoting armrest is pivoted to the horizontal position to permit storage of luggage through the bulkhead and into the occupant compartment, sensing a position of the access door to determine the vertical closed position or the open horizontal position; and said method further including the step of not deploying the airbag if the access door is in the open horizontal position indicating the storage of luggage through the bulkhead where the luggage would interfere with the deployment of the airbag mounted on the seat back.

10. A method for controlling an airbag mounted in a seat back of a vehicle seating system having both the airbag and a pivoting armrest mounted on the seat back on a same side of an occupant seating position defined by the seat back, and the pivoting armrest pivots relative the seat back and the airbag between a vertical position interfering with a deployment of the airbag mounted on the seat back and a horizontal position of the armrest permitting unobstructed deployment of the airbag, comprising:

providing a passenger-side seat back spaced from a driver-side seat back and the pivoting armrest pivoting between the driver-side seat back and the passenger-side seat back so that the pivoting armrest when in the vertical position provides a back rest for a center seat occupant;

sensing a position of the pivoting armrest to determine the vertical position providing the back rest or the horizontal position providing the pivoting armrest;

sensing vehicle conditions indicative of a need to deploy the airbag;

and not deploying the airbag mounted on the seat back if the pivoting armrest mounted on the seat back is in the vertical position interfering with the deployment of the airbag.

11. The method of claim 10 further comprising the sensing of the vehicle conditions including sensing the presence of an impact on the driver side and not deploying the airbag if the impact is on the driver side.

12. The method of claim 11 further comprising the sensing of the vehicle conditions including sensing the presence of an impact on the driver side and deploying the airbag with a delay if the impact is on the driver side.

13. The method of claim 10 further comprising the sensing of the vehicle conditions including sensing the presence of an impact on the driver side of the vehicle, sensing the presence of an occupant seated on the passenger side, and deploying the pivoting airbag if the impact is on the driver side and an occupant is seated in the passenger seat so the pivoting airbag is deployed between the driver-side occupant and the passenger-side occupant.

14. The method of claim 13 further comprising the sensing of the vehicle conditions including sensing the presence of an impact on the driver side and deploying the airbag with a delay if the impact is on the driver side.

15. A method for controlling an airbag mounted in a seat back of a vehicle seating system having both the airbag and a pivoting armrest mounted on the seat back on a same side of an occupant seating position defined by the seat back, and the pivoting armrest pivots relative the seat back and the airbag between a vertical position interfering with a deployment of the airbag mounted on the seat back and a horizontal position of the armrest permitting unobstructed deployment of the airbag, comprising:

providing a driver-side seat back within a seat back that also provides a passenger-side seat back and a center occupant seat back, with an opening provided in the seat back, the pivoting armrest being stored within the opening provided in the seat back to form a part of the center occupant seat back when pivoted to the vertical position and forming the pivoting armrest when pivoted to a horizontal position;

sensing the position of the pivoting armrest to determine the vertical position providing a part of the back rest or the horizontal position providing the pivoting armrest;

sensing vehicle conditions indicative of a need to deploy the airbag mounted on the seat back;

and not deploying the airbag mounted on the seat back if the pivoting armrest mounted on the seat back is in the vertical position interfering with the deployment of the airbag.

16. The method of claim 15 further comprising the sensing of the vehicle condition including sensing the presence of an impact on the driver side and not deploying the airbag if the impact is on the driver side.

17. The method of claim 15 further comprising the sensing of the vehicle conditions including sensing the presence of an impact on the driver side and deploying the airbag with a delay if the impact is on the driver side.

18. The method of claim 15 further comprising the sensing of the vehicle conditions including sensing the presence of an impact on the driver side of the vehicle, sensing the presence of an occupant seated on a passenger-side seat, and deploying the airbag if the impact is on the driver side and an occupant is seated in the passenger-side seat so the airbag is deployed between a driver-side occupant and a passenger-side occupant.

19. The method of claim 15 further comprising the vehicle seating system mounted in an occupant compartment, a luggage compartment rearwardly of the center occupant seat and defined by a bulkhead separating the occupant compartment and the luggage compartment, an access door pivotally mounted on the bulkhead for movement between a vertical closed position separating the occupant compartment and the cargo compartment and an open horizontal position when the pivoting armrest is pivoted to the horizontal position to permit storage of luggage through the bulkhead and into the occupant compartment, sensing the position of the access door to determine the vertical closed position or the open horizontal position; and said method further including the step of not deploying the airbag if the access door is in the open horizontal position indicating the storage of luggage through the bulkhead where the luggage would interfere with the deployment of the airbag mounted on the seat back.

\* \* \* \* \*